US010236736B2

(12) United States Patent
Irwanto et al.

(10) Patent No.: US 10,236,736 B2
(45) Date of Patent: Mar. 19, 2019

(54) DAMPER FINGER SEGMENT FOR GENERATOR ROTOR END

(71) Applicant: ALSTOM Technology Ltd, Baden (CH)

(72) Inventors: Bartolomeus Irwanto, Brugg (CH); Yvonne Riedling, Birr (CH); Gunter Scherf, Birr (CH)

(73) Assignee: General Electric Technology GmbH, Baden (CH)

( * ) Notice: Subject to any disclaimer, the term of this patent is extended or adjusted under 35 U.S.C. 154(b) by 930 days.

(21) Appl. No.: 14/601,294

(22) Filed: Jan. 21, 2015

(65) Prior Publication Data
US 2015/0207373 A1 Jul. 23, 2015

(30) Foreign Application Priority Data

Jan. 23, 2014 (EP) ..................................... 14152261

(51) Int. Cl.
*H02K 3/16* (2006.01)
*H02K 1/26* (2006.01)
*H02K 3/51* (2006.01)

(52) U.S. Cl.
CPC ................. *H02K 3/16* (2013.01); *H02K 1/26* (2013.01); *H02K 1/265* (2013.01); *H02K 3/51* (2013.01)

(58) Field of Classification Search
CPC .. H02K 3/16; H02K 3/12; H02K 3/50; H02K 3/51; H02K 3/505; H02K 1/26;
(Continued)

(56) References Cited

U.S. PATENT DOCUMENTS 1,637,182 A * 7/1927 Glaubitz .................. H02K 3/16
310/183
3,157,809 A * 11/1964 Bekey ..................... H02K 21/14
310/156.27
3,230,404 A * 1/1966 Graham ................. H02K 1/243
310/168
(Continued)

FOREIGN PATENT DOCUMENTS

CN 201656597 U 11/2010
CN 102577032 A 7/2012
(Continued)

OTHER PUBLICATIONS

K. Weigelt, "Konstruktionsmerkmale grosser Turbogeneratoren", ABB Technik Jan. 1, 1989, pp. 3 to 14.
(Continued)

*Primary Examiner* — Bernard Rojas
*Assistant Examiner* — Maged M Almawri
(74) *Attorney, Agent, or Firm* — GE Global Patent Operation; Rita D. Vacca

(57) ABSTRACT

A damper finger segment is radially disposed between a retaining ring and a damper ring arrangement at a rotor end of a generator arrangement, in particular of a high power turbogenerator, having a multitude of plate-like finger elements with a longitudinal extension and arranged parallel to each other. Each neighboring pair of finger elements encloses a gap and all finger elements are joined at one end of each finger element by a band-like strip section having a longitudinal extension being oriented orthogonally to the longitudinal extension of the finger elements. At least one slot is provided in each plate-like finger element and/or in the band-like strip section. The at least one slot has a slot axis oriented parallel to the longitudinal extension of the plate-like finger elements.

8 Claims, 3 Drawing Sheets

(58) Field of Classification Search
CPC .... H02K 1/265; H02K 2205/00; H02K 21/46; H02K 23/22; H02K 17/16; H02K 17/165; H02K 17/18; H02K 19/14
USPC ...... 310/270, 271, 183, 182, 156.74–156.81, 310/51, 179, 211, 171; 29/598
See application file for complete search history.

(56) References Cited

U.S. PATENT DOCUMENTS

| | | | | |
|---|---|---|---|---|
| 4,143,290 A * | 3/1979 | Mizukami | ................ | H02K 3/51 310/270 |
| 4,617,485 A * | 10/1986 | Nakamura | ............. | H02K 1/243 310/214 |
| 4,967,465 A * | 11/1990 | Frank | ....................... | H02K 3/51 29/426.5 |
| 6,720,703 B1 * | 4/2004 | Braun | .................... | H02K 1/243 310/263 |
| 6,836,053 B2 * | 12/2004 | Gohn | ....................... | H02K 3/51 310/270 |
| 6,864,617 B1 * | 3/2005 | Wang | ....................... | H02K 3/51 310/214 |
| 7,589,447 B2 * | 9/2009 | Stout | ....................... | F16C 27/04 310/51 |
| 2002/0180305 A1 * | 12/2002 | Gohn | ....................... | H02K 3/51 310/270 |
| 2006/0038462 A1 * | 2/2006 | Holmes | .................... | H02K 3/51 310/270 |
| 2013/0221797 A1 | 8/2013 | Rigosu, Jr. et al. | | |

FOREIGN PATENT DOCUMENTS

| | | |
|---|---|---|
| EP | 0 468 784 A2 | 1/1992 |
| GB | 2 403 074 A | 12/2004 |

OTHER PUBLICATIONS

Machine Translation and First Office Action and Search issued in connection with corresponding CN Application No. 201510034405.1 dated Feb. 13, 2018.

* cited by examiner

DAMPER FINGER SEGMENT FOR GENERATOR ROTOR END

CROSS-REFERENCE TO RELATED APPLICATIONS

This application claims priority to European application 14152261.5 filed Jan. 23, 2014, the contents of which are hereby incorporated in its entirety.

TECHNICAL FIELD

The invention relates to a damper finger segment radially disposed between a retaining ring and a damper ring arrangement at a rotor end of a generator arrangement, in particular of a high power turbogenerator, having a multitude of plate-like finger elements with a longitudinal extension and arranged parallel to each other, each neighboring pair of finger elements encloses a gap and all finger elements are joined at one end of each finger element by a band-like strip section having a longitudinal extension being oriented orthogonally to the longitudinal extension of the finger elements.

BACKGROUND

Turbogenerators are high advance electrical machines which are connected typically with a gas- or steamturbine arrangement for the purpose of generation of electrical power. The major elements of a turbogenerator are a rotor rotating about an axis and a stator which concentrically surrounds the rotor. Examples of turbogenerators are disclosed in the Article by K. Weigelt, "Konstruktionsmerkmale grosser Turbogeneratoren", ABB Technik January 1998, pages 3 to 14.

One end section of a typical rotor 1 is illustrated in FIG. 2 which is disclosed in the document DE 10327976 A1 corresponding to UK GB 2403074. The rotor 1 provides at its one end a winding head 2 which connects individual conductors 3 to one another to form a winding of the rotor. The conductors 3 are combined into blocks and inserted into corresponding longitudinal slots 4 of the rotor 1. Whereas the conductors 3 being electrically insulated are secured by wedges 5 in the radial direction, the winding head 2 is secured by means of a retaining ring 6, which is only partly shown in FIG. 2. The retaining ring 6 essentially comprises an annular body and is shrunk onto the rotor 1 radially on the outside in the region of the winding head 2. In this case the retaining ring 6 is designed as a solid steel body in order to be able to absorb the centrifugal forces occurring during operation of the machine equipped with the rotor 1, i.e. an electric motor or generator, in particular a turbogenerator of a power plant.

Provided radially between the retaining ring 6 and the winding head 2 is a damper ring arrangement 7 which is segmented typically, i.e. consists of at least one damper ring having a slit for traversing the damper ring in its circumferential direction, and encloses the winding head 2 in circumferential direction. Furthermore a plurality of different insulating layers 8, 9, 10 and a further plurality of so called damper segments 11 are provided, which are arranged in a radially encircling manner between the retaining ring 6 and the winding head 2. Hereby the damper segments 11, which comprises a multitude of plate-like finger elements disposed in circumferential direction side by side and being connected with each other, electrically contact at one side end with the plurality of wedges 5, which are of electrically conductive material, and otherwise contact the damper ring arrangement 7. Therefore the wedges 5 in combination with the damper segments 11 and the damper ring arrangement 7 form a so called damper cage extending over the whole rotor core and winding assembly. The chief purpose of this damper cage is to improve the electrical damping properties and the operating reliability of the rotor, by allowing a defined compensation current flow which relieves the rotor body electrically and also protects other parts of the rotor. This permits the generator to be operated under special conditions and enables it to cope with certain line faults without damage.

During operation all components of the rotor are subjected to thermal expansion and large centrifugal forces so that especially the wedges 5, the damper segments 11 and the damper rings 7 stay in loose contact to ensure relative movement. The damper segments 11 are in the form of structured plate-like ring bands, each of which is formed to enclose the rotor segmentally, so that in the overall arrangement at least two damper segments 11 enclose the rotor in circumferential direction completely. Each damper segment 11 provides a multitude of plate-like finger elements which are identical in size and shape providing a longitudinal extension and being arranged parallel to each other. The multitudes of plate-like finger elements are arranged side by side so that each neighboring pair of finger elements encloses a gap. All finger elements are joined at one end by a band-like strip section typically in one piece. The band-like strip section provides a longitudinal extension which is oriented orthogonally to the longitudinal extension of the finger elements. Integrated in the rotor, the longitudinal extension of the band-like strip section is oriented in the circumferential direction of the rotor whereas the longitudinal extensions of all plate like finger elements are directed axially to the rotor. Each plate like-finger element stays in loose contact with its radial upper surface with a radial inner surface of an end portion of a wedge, so that mechanical and electrical contact is ensured in operation mode of the electrical machine due to acting centrifugal forces.

Due to different kinds of uncontrolled movement between each plate-like finger element and the surface of a corresponding wedge mutual dislocations may be occur which can lead to altered contact surfaces or even mutual mechanical stresses between the wedges and the finger elements. This however deteriorates the above-mentioned function of the whole damper cage.

SUMMARY

It is an object of the invention to provide a damper finger segment which is radially disposed between a retaining ring and a damper ring arrangement at a rotor end of a generator arrangement, in particular of a high power turbogenerator, and which shall contribute to avoid possible misplacements between the plate-like finger elements and corresponding contact surfaces of the wedges. The provisions to be taken shall be robust in regard of centrifugal forces acting under work mode of the generator arrangement, but shall still allow relative movement between the finger elements and the wedges to compensate different thermal expansion effects.

The object is achieved by the sum total of the features of the independent claim 1. The invention can be modified advantageously by the features disclosed in the sub claims as well in the following description especially referring to preferred embodiments.

The inventive damper finger segment according to the preamble of claim 1 is characterized in that at least one slot is provided in each plate-like finger element and/or in the band-like strip section. The at least one slot has a slot axis which is oriented parallel to the longitudinal extension of the plate-like finger elements which are all arranged parallel side by side along the band-like strip section.

The inventive idea is aimed at increasing the flexibility of the damper finger segment in general compared to a well known damper finger segment without any slots, so that canting effects due to uncontrolled movement between the plate-like finger elements and the wedges or other bordering components of the rotor can be excluded safely.

In a first inventive embodiment the plate-like finger elements of the damper finger segment provide a rectangular plate-like shape which in each case is bordered by two longer and two shorter side edges, where in each case one shorter side edge of the finger element is joined in one piece with the band-like strip section. All plate-like finger elements are arranged along one common side edge of the band-like strip section which also provides a rectangular plate-like shape, so that the damper finger segment is comparable with a comp structure having comp teeth which correspond to the plate-like finger elements arranged side by side along the band-like strip section. Inventively each plate-like finger element provides a slot which opens at the short side edge opposite to the band-like strip section and reaching along the longitudinal extension of the plate-like finger element parallel to the longer side edge of the finger element, so that the plate-like finger element is divided into two separate finger portions. Each of the finger portions remains joined in one peace with the band-like strip section which can be banded independently from each other relative to the band-like strip section like a one side fixed spring bar. It is a matter of fact that the flexibility of each plate-like finger element is enhanced significantly due to the slot along each finger element. Of course, several of parallel slots may be introduced in each plate-like finger element, as long as this has advantages properties with it.

Another inventive idea to enhance flexibility of the damper finger segment can be realized alternatively or in combination with the before mentioned slot integration into each plate-like finger element, by introducing at least one slot into the band-like strip section itself. As mentioned above the band-like strip section typically provides a rectangular plate-like shape having a longitudinal extension which is orthogonal to the longitudinal extensions of each plate-like finger element. So the band-like strip section provides two longer side edges which are referred as first and second side edge. Along the first side edge the plate-like finger elements are arranged side by side, with each disposed two adjacent fingers including a gap with constant width. At least one slot is arranged at the second side of the band-like strip section between two neighboring plate-like finger elements such that the at least one slot opens at the second side and extends to half or more than half into the band-like strip section. In a very preferred embodiment a number of slots corresponding to the number of gaps which are enclosed by neighboring plate-like finger elements are disposed along the second side of the band-like strip section in the same manner as mentioned above. Having the slots integrated into the band-like strip section the strip section becomes more flexible so that surface bending may occur along the first side of the band-like strip section.

A further possibility of providing slots into the band-like strip section is to provide slots at the first side edge preferably directly adjacent to both sides of each plate-like finger element so that each slot opens at the first side of the band-like strip section and extents into the band-like strip section partially. Alternatively or in combination with slots being arranged directly adjacent to both sides of each plate-like finger element such kind of slots can be position anywhere between two neighboring plate-like finger elements. More details can be derived in the description below referring to illustrated embodiments.

All slots mentioned above provide a slot width which is significantly smaller than the width of the gap which is bordered by two neighboring plate-like finger elements. The slot width therefore can be dimensioned between a fraction of a millimeter to some less millimeters or less centimeters depending on the dimension of the finger elements and the damper finger segment at all.

All slots introduced into the damper finger segment are arranged parallel to each other and parallel to the longitudinal extension of each finger element.

In a further preferred embodiment of the damper finger segment each plate-like finger element provides a section along its longitudinal extension in which the thickness of the plate-like finger element is reduced. The section of reduced thickness in particular has an extension along each plate-like finger element which is less than the half length of the longitudinal extension of the plate-like finger element. The section of reduced thickness has the effect that flexibility in orthogonal direction to the plate-like surface of each plate-like finger element can be enhanced significantly so that the risk of canting of the plate-like finger element at adjacent components of the rotor especially at the wedges can be minimized.

BRIEF DESCRIPTION OF THE DRAWINGS

The invention shall subsequently be explained in more detail based on exemplary embodiments in conjunction with the drawings. In the drawing

DETAILED DESCRIPTION

Figure 1:
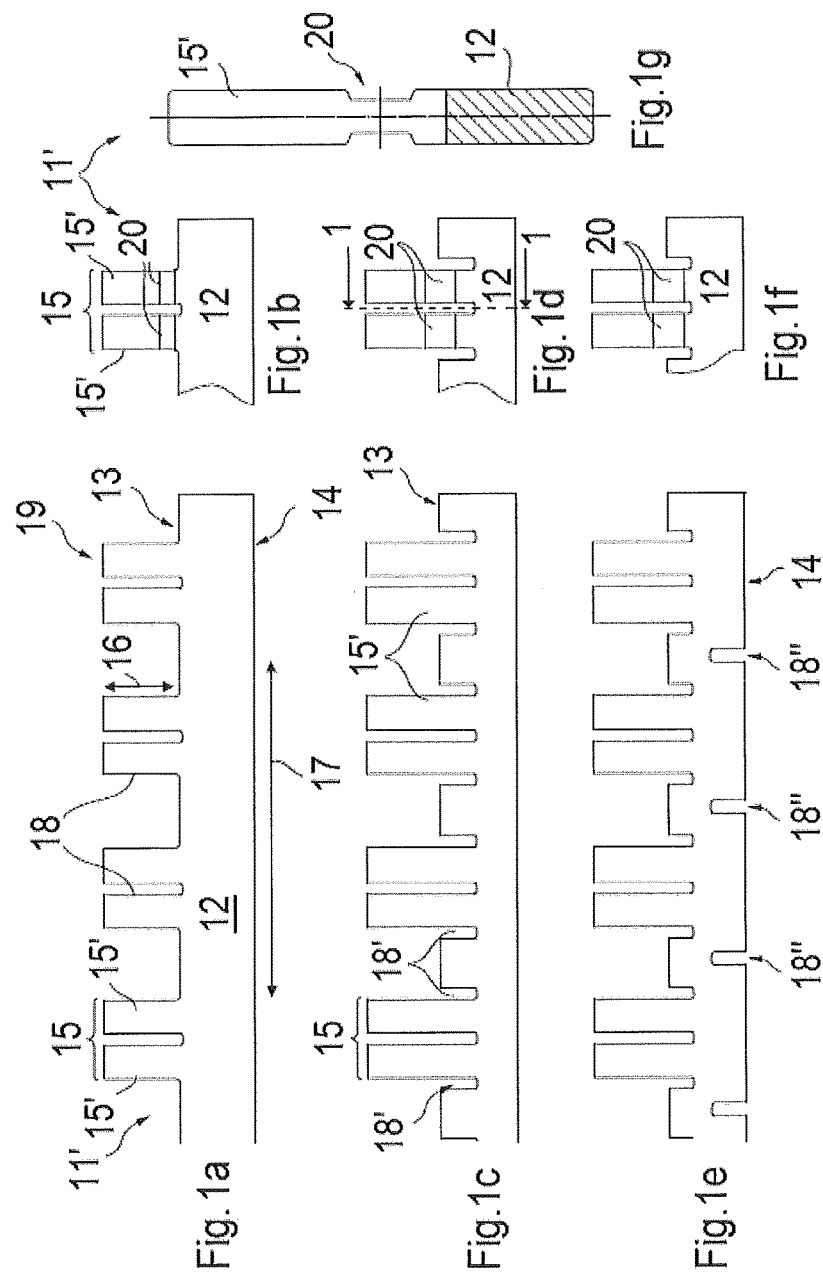
FIG. 1a shows a side view of a portion of a damper finger segment with a band-like strip section, with a number of plate-like finger elements projecting from the band-like strip section and finger element portions with slots between the finger element portions in accordance with one embodiment of the present invention.
FIG. 1b shows side view of a portion of a damper finger segment having two sections with reduced thickness at the plate-like finger elements in accordance with another embodiment of the present invention.
FIG. 1c shows a side view of a portion of a damper finger segment with a band-like strip section, with a number of plate-like finger elements projecting from the band-like strip section and finger element portions with slots between the finger element portions in accordance with another embodiment of the present invention.
FIG. 1d shows side view of a portion of a damper finger segment having two sections with reduced thickness at the plate-like finger elements in accordance with another embodiment of the present invention.
FIG. 1e shows a side view of a portion of a damper finger segment with a band-like strip section, with a number of plate-like finger elements projecting from the band-like strip section and finger element portions with slots between the finger element portions and additional slots at the bottom side of the band like-strip section in accordance with another embodiment of the present invention.
FIG. 1f shows side view of a portion of a damper finger segment having two sections with reduced thickness at the plate-like finger elements in accordance with another embodiment of the present invention.
FIG. 1g shows a cross-sectional view the damper finger segment of FIG. 1d taken along the line 1-1.
Figure 2:
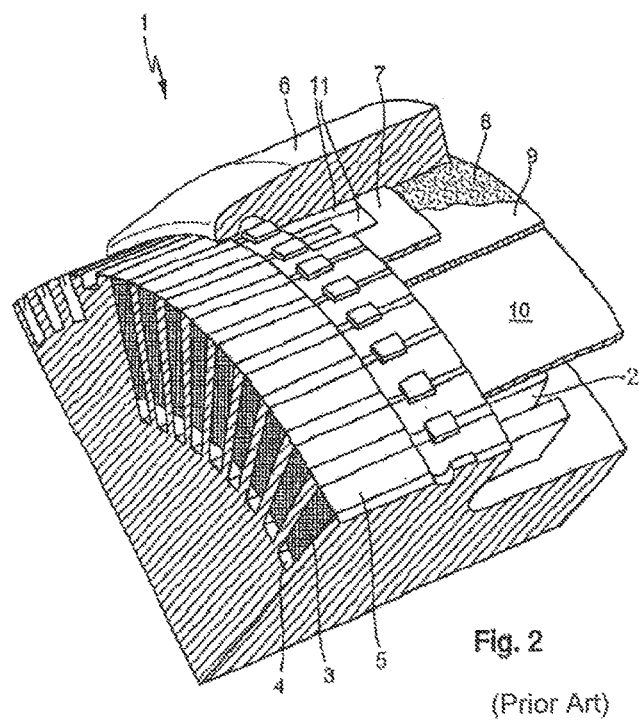
FIG. 2 shows one end section of a rotor of a turbo generator (prior art)

FIG. 1a shows an inventive damper finger segment 11' comprising a band-like strip section 12 having a first side edge 13 and a second side edge 14. Along the first side edge 13 four plate-like finger elements 11' are disposed and joined in one peace with the band-like strip section 12. Each plate-like finger element 15 provides a longitudinal extension 16 which is oriented orthogonal to the longitudinal extension 17 of the band-like strip section 12. Each plate-like finger element 15 provides a slot 18 which opens at the short edge 19 being opposite to the band-like strip section 12 of each finger element 15. The length of each slot 18 corresponds to the longitudinal extension of each plate-like finger element 15 preferably. Due to the slot 18 each plate-like finger element 15 is subdivided into two separate finger portions 15'. The inventive idea is not limited to the numbers of slots per plate-like finger element so that the plate-like finger elements 15 can be subdivided into more finger portions 15' providing two or more slots like mentioned before.

Typically all plate-like finger elements 15 and the band-like strip section provide a same thickness and being made of an electrically conductive material preferably of metal. In a preferred embodiment each plate-like finger element 15 being subdivided into at least two separate finger portions 15' by at least one slot 18 may further provide a section 20 in which the thickness of the plate-like finger element is reduced locally. Such an embodiment is shown in FIG. 1a to the right, which shows just a partial view of a damper finger segment 11'. Further a cross section view of a damper finger segment 11' with a plate-like finger element 15 having a section 20 with a reduced thickness is illustrated. From the cross section view it is conceivable that the plate-like finger element 15 respectively 15' provides a constant thickness along its entire longitudinal extension beside of the section 20 in which the thickness is reduced locally. The embodiment shows a symmetrically side-cut at the section 20 of reduced thickness. Also it can be conceived from the cross section view that the plate-like finger element 15, 15' respectively is joined in one piece with the band-like strip section 12.

Additionally it is preferred that section 20 having the reduced thickness provides a longitudinal extension which is less than the half length of the longitudinal extension of the plate-like finger element. Further it is of advantage to arrange the section 20 close to the band-like strip section 12 directly or indirectly so that each plate-like finger element 15 can bend easily orthogonally to the surface level of the band-like strip section 12.

A further embodiment is shown in FIG. 1c which provides additional slots 18' being directly adjacent to both sides of each plate-like finger element 15, respectively finger element portions 15' by entering the first side 13 of the band-like strip section 12 and extending into the band-like strip section 12 partially. In this embodiment the length of the slot 18 which separates the plate-like finger element 15 into at least two separate finger portions 15' is elongated comparing to the embodiment shown in FIG. 1a such that the slot depth the slot 18 corresponds to the slot bottom of the slots 18'. As indicated in the illustration on the right hand side of FIG. 1b the plate-like finger elements 15 can also be equipped with sections 20 having the reduce thickness as mentioned above.

A third preferred embodiment shown in FIG. 1e provides the same slot structure at the first side edge 13 of the band-like strip section 12 as well the slots into the plate-like finger elements 15 but contain additionally slots 18" which are arranged at the second side 14 between two neighboring plate-like finger elements 15 such that the slots 18" opens at the second side and extends to half or more than half into the band-like strip section 12. In the same way the plate-like finger elements 15 can be provided with section 20 of reduced thickness.

All the embodiments shown in FIG. 1a to g provide an enhanced flexibility at least of the finger elements 15. The embodiments shown in FIGS. 1c and e further comprises enhanced flexibility of the band-like strip section 12 itself. The enhanced surface flexibility allows an enhanced movement of the damper finger segment 11' arranged between the retaining ring 6 and the damper ring arrangement 7 so that misalignment or jamming or canting effects can be avoided clearly. This ensures that electrical contact between each of the wedges 5 and the damper finger segment can be maintained properly to allow compensation current flow in the entire circumferential direction around the rotor arrangement.

Figure 3:
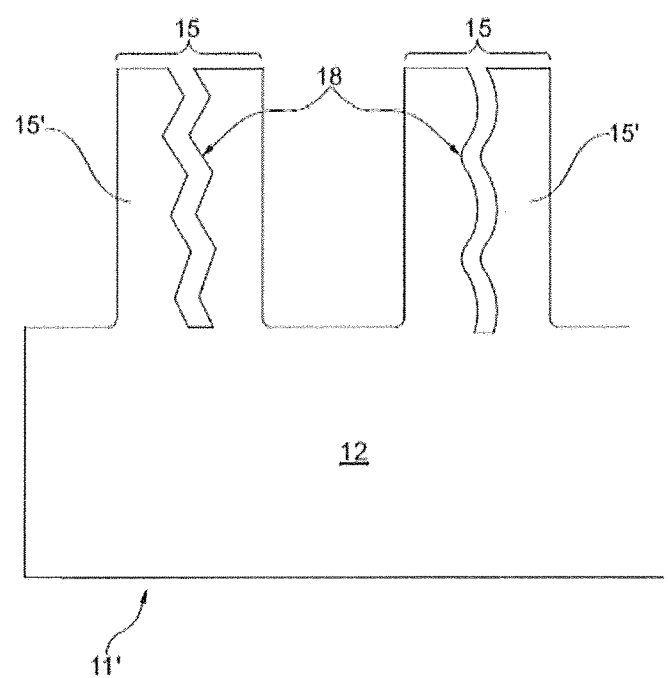
FIG. 3 shows an embodiment with different shapes of slot.

FIG. 3 shows a partial section of a damper segment 11' comprising plate-like finger elements 15 which provide a slot 18 having a shape which deviates from the linear shape as shown in the embodiments above. The slot 18 can be of zigzag shape, illustrated in the left finger element, or of bumpy shape, like in case of the finger element to the right. The possibilities of geometries for slots are unlimited basically as long as the slot divides each plate-like finger element 15 into separate finger portions 15' and bending of each finger portion 15 relative to the band-like strip section 12 is enhanced.

In the same way the slots 18' and 18" shown in the embodiments of FIGS. 1b and c can be formed in the same way.

The invention claimed is:

1. A damper finger segment radially disposed at a rotor end of a generator arrangement, the damper finger segment comprising:

a multitude of plate-like finger elements with a longitudinal extension;

each plate-like finger element of the multitude of plate-like finger elements is arranged parallel to each other plate-like finger element;

each neighboring pair of finger elements of the multitude of plate-like finger elements encloses a gap between the neighboring pair of finger elements;

each plate-like finger element is joined at one end of the plate-like finger element to a first side of a band-like strip section;

the band-like strip section having a longitudinal extension oriented orthogonally to the longitudinal extension of each plate-like finger element joined to the first side of the band-like strip section;

at least one slot is provided in each plate-like finger element extending the longitudinal extension of the plate-like finger element into the band-like strip section, with the at least one slot having a slot axis oriented parallel to the longitudinal extension of the plate-like finger elements;

a second side of the band-like strip section opposite the first side; and a minor slot directly adjacent to each side of each plate-like finger element, the minor slot opening at the first side of the band-like strip section and extending partially into a width extending between the first side and the second side of the band-like strip section.

2. The damper finger segment according to claim 1, wherein the at least one slot has a slot width which is smaller than the width of the gap.

3. The damper finger segment according to claim 1, wherein the at least one slot is provided in each plate-like finger element dividing each plate-like finger element in separate finger element portions.

4. The damper finger segment according to claim 1, wherein the at least one slot is provided in each plate-like finger element and opens at a side edge of each plate-like finger element opposite that joined to the first side of the band-like strip section.

5. The damper finger segment according to claim 1, wherein at least one another slot is arranged in the second side opposite the gap, opening at the second side, and extending to half or more than half of the width extending between the first side and the second side of the band-like strip section.

6. The damper finger segment according to claim 1, wherein each plate-like finger element includes a section within its longitudinal extension of reduced thickness.

7. The damper finger segment according to claim 6, wherein the section extends less than a half length of the longitudinal extension of the plate-like finger element.

8. The damper finger segment according to claim 6, wherein the section of each plate-like finger element extends within or borders the band-like strip section.

* * * * *